United States Patent
Wang et al.

(10) Patent No.: US 9,930,746 B2
(45) Date of Patent: Mar. 27, 2018

(54) SILICON-CONTROLLED RECTIFIER CURRENT-PROTECTION CIRCUIT, RELATED OPERATING METHOD, AND DIMMING CIRCUIT AND LIGHTING DEVICE CONTAINING THE SAME

(71) Applicant: ZHEJIANG SHENGHUI LIGHTING CO., LTD, Jiaxing (CN)

(72) Inventors: Zhonghua Wang, Jiaxing (CN); Junshan Lou, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 0 days.

(21) Appl. No.: 15/325,739

(22) PCT Filed: Jul. 8, 2016

(86) PCT No.: PCT/CN2016/089494
§ 371 (c)(1),
(2) Date: Jan. 12, 2017

(87) PCT Pub. No.: WO2017/005218
PCT Pub. Date: Jan. 12, 2017

(65) Prior Publication Data
US 2017/0150559 A1    May 25, 2017

(30) Foreign Application Priority Data
Jul. 8, 2015    (CN) .......................... 2015 1 0404244

(51) Int. Cl.
*H05B 33/08*    (2006.01)
(52) U.S. Cl.
CPC ....... *H05B 33/089* (2013.01); *H05B 33/0809* (2013.01); *H05B 33/0845* (2013.01)

(58) Field of Classification Search
CPC .............. H05B 33/089; H05B 33/0809; H05B 33/0845
See application file for complete search history.

(56) References Cited

U.S. PATENT DOCUMENTS

2014/0062322 A1*  3/2014  Yu ...................... H05B 33/0851
                                                  315/200 R
2014/0346964 A1* 11/2014  Chen .................. H05B 33/0842
                                                  315/200 R
(Continued)

FOREIGN PATENT DOCUMENTS

CN    101882879 A  * 11/2010
CN    103607825 A    2/2014
(Continued)

OTHER PUBLICATIONS

The World Intellectual Property Organization (WIPO) International Search Report for PCT/CN2016/089494 dated Sep. 21, 2016 p. 1-12.

*Primary Examiner* — Tung X Le
*Assistant Examiner* — Raymond R Chai
(74) *Attorney, Agent, or Firm* — Anova Law Group, PLLC

(57) ABSTRACT

The present disclosure provides a silicon-controlled silicon (SCR) current-protection circuit. The SCR circuit includes an SCR detection circuit and a protection circuit, a first terminal of the SCR detection circuit being connected to a current sampling point on an output terminal of an SCR device, a second terminal of the SCR detection circuit being connected to a power conversion circuit, a third terminal of the SCR detection circuit being connected to a first terminal of the protection circuit, and a second terminal of the protection being connected to the power conversion circuit. When the SCR device is connected to the SCR current-protection circuit, the SCR detection circuit is configured to
(Continued)

detect a current flowing through the current sampling point, convert the current to a voltage, and output the voltage to the protection circuit. The protection circuit is further configured to control on and off states of the power conversion circuit based on the voltage.

19 Claims, 14 Drawing Sheets

(56) References Cited

U.S. PATENT DOCUMENTS

| | | | |
|---|---|---|---|
| 2015/0069929 A1* | 3/2015 | Sumitani | H05B 33/0815 |
| | | | 315/291 |
| 2015/0146461 A1* | 5/2015 | Deng | H02M 7/1557 |
| | | | 363/85 |
| 2016/0366735 A1* | 12/2016 | Tian | H02M 1/4208 |

FOREIGN PATENT DOCUMENTS

| | | |
|---|---|---|
| CN | 104540292 A | 4/2015 |
| CN | 105101538 A | 11/2015 |

\* cited by examiner

| When the SCR device is connected to the circuit, the SCR detection circuit detecting the current flowing through the current sampling point, converting the detected current to voltage, and outputting the processed voltage to the protection circuit | ─S101 |

| The protection circuit comparing the processed voltage to a reference voltage, where if the processed voltage is greater than the reference voltage, the protection circuit controlling the power conversion circuit to stop power conversion functions, and if the processed voltage is smaller than the reference voltage, the protection circuit controlling the power conversion circuit to start power conversion functions | ─S102 |

SILICON-CONTROLLED RECTIFIER CURRENT-PROTECTION CIRCUIT, RELATED OPERATING METHOD, AND DIMMING CIRCUIT AND LIGHTING DEVICE CONTAINING THE SAME

CROSS-REFERENCES TO RELATED APPLICATIONS

This application is a national phase entry under 35 USC § 371(c) of PCT Application No. PCT/CN2016/089494, filed on Jul. 8, 2016, which claims the priority of Chinese Patent Application No. 201510404244.0 filed on Jul. 8, 2015. The above enumerated patent applications are incorporated by reference herein in their entirety.

FIELD OF THE DISCLOSURE

The present disclosure relates to the field of light emitting diode (LED) technologies and, more particularly, relates to a silicon-controlled rectifier (SCR) current-protection circuit, a related operating method, a dimming circuit incorporating the SCR protection circuit, and a lighting device incorporating the dimming circuit.

BACKGROUND

A silicon-controlled rectifier (SCR) is a four-layered high-power semiconductor device with three P-N junctions. An SCR is also referred to as a thyristor. SCRs have advantages such as being small, having relatively simple structures, and high performances, and thus have been widely used in various electronic devices and electronic products. SCRs are mainly used as rectifiers, inverters, frequency converters, voltage regulators, non-contact switches, etc.

SCR devices are widely used in many home appliances, such as dimmers, speed-controllable fans, and cameras, and industrial control equipment to rectify electric current and/or regulate voltages. For example, light-emitting diode (LED) lights often have advantages such as high light-emitting efficiency, long service time, and high stability. LED lights or LED backlights are often used in a dimmer for lighting functions. When using the LED lights or LED backlight for lighting functions, users often connect the existing LED lighting circuit to a conventional SCR dimmer. After the SCR device in the SCR dimmer chops the alternating current (AC) current, voltages inputted into the LED lights or LED backlight decrease, and the effective value of the input current increases. As a result, the loads, i.e., the LED lights or the LED backlight, can be damaged.

The disclosed systems and methods are directed to solve one or more problems set forth above and other problems.

BRIEF SUMMARY OF THE DISCLOSURE

One aspect or embodiment of the present disclosure provides a silicon-controlled silicon (SCR) current-protection circuit. The SCR circuit includes an SCR detection circuit and a protection circuit, a first terminal of the SCR detection circuit being connected to a current sampling point on an output terminal of an SCR device, a second terminal of the SCR detection circuit being connected to a power conversion circuit, a third terminal of the SCR detection circuit being connected to a first terminal of the protection circuit, and a second terminal of the protection being connected to the power conversion circuit. When the SCR device is connected to the SCR current-protection circuit, the SCR detection circuit is configured to detect an electric current flowing through the current sampling point, convert the electric current to a voltage, and output the voltage to the protection circuit. The protection circuit is further configured to control on and off states of the power conversion circuit based on the voltage.

The SCR current-protection circuit according to claim 1, further including a current rectifying circuit, wherein the current rectifying circuit is arranged between the current sampling point and the SCR device to rectify an electric current outputted by the SCR device and output a rectified electric current to the current sampling point.

Optionally, the SCR current-protection circuit further includes a current-voltage conversion circuit and a voltage-peak processing circuit, a first terminal of the current-voltage conversion circuit being connected to the current sampling point, a second terminal of the current-voltage conversion circuit being connected to the power conversion circuit, a third terminal of the current-voltage conversion circuit being connected to a first terminal of the voltage-peak processing circuit, and a second terminal of the voltage-peak processing circuit being connected to the first terminal of the protection circuit. When the SCR device is connected to the SCR current-protection circuit, the current-voltage conversion circuit is configured to sample an electric current flowing through the current sampling point, convert the electric current to a voltage, output the voltage to the voltage-peak processing circuit. The voltage-peak processing circuit is configured to perform a peak-processing process on the voltage and output a processed voltage to the protection circuit.

Optionally, the protection circuit includes a voltage sampling circuit and a hysteresis comparator, a first terminal of the voltage-sampling circuit being connected to a second terminal of the voltage-peak processing circuit, a second terminal of the voltage-sampling circuit being connected to a first input terminal of the hysteresis comparator, a second input terminal of the hysteresis comparator being configured to input a reference voltage, and an output terminal of the hysteresis comparator being connected to the power conversion circuit. The voltage-sampling circuit is configured to sample and calculate a voltage outputted by the voltage-peak processing circuit to obtain an output voltage; and the hysteresis comparator is configured to compare the output voltage to the reference voltage.

Optionally, if the output voltage is greater than the reference voltage, the hysteresis comparator outputs a logic low level to turn off the power conversion circuit. If the output voltage is smaller than the reference voltage, the hysteresis comparator outputs a logic high level to turn on the power conversion circuit.

Optionally, the current-voltage conversion circuit includes a first resistor and a temperature sampling module, a first terminal of the first resistor being connected to the current sampling point, another terminal of the first resistor being connected to the power conversion circuit, the temperature sampling module being arranged on the first resistor, and the temperature sampling module being connected to the first terminal of the voltage-peak processing circuit. When the SCR device is connected to the SCR current-protection circuit, the temperature sampling circuit is configured to sample a temperature of the first resistor, calculate a voltage applied on the first resistor based on the temperature of the first resistor, and outputs the voltage to the voltage-peak processing circuit.

Optionally, the SCR current-protection circuit further includes a current sensor and a detection circuit, a first terminal of the current sensor being connected to the current sampling point, a second terminal of the current sensor being connected to the power conversion circuit, a third terminal of the current sensor being connected to a first terminal of the detection circuit, and a second terminal of the detection circuit being connected to the first terminal of the protection circuit. When the SCR device is connected to the SCR current-protection circuit, the current sensor is configured to sample an electric current flowing through the current sampling point, convert the electric current to a voltage, and output the voltage to the protection circuit.

Optionally, the protection circuit includes a voltage sampling circuit and a hysteresis comparator, a first terminal of the voltage-sampling circuit being connected to a second terminal of the detection circuit, a second terminal of the voltage-sampling circuit being connected to a first input terminal of the hysteresis comparator, a second input terminal of the hysteresis comparator being configured to input a reference voltage, and an output terminal of the hysteresis comparator being connected to the power conversion circuit. The voltage-sampling circuit is configured to sample and calculate a voltage outputted by the detection circuit to obtain an output voltage. The hysteresis comparator is configured to compare the output voltage to the reference voltage.

Optionally, if the output voltage is greater than the reference voltage, the hysteresis comparator outputs a logic low level to turn off the power conversion circuit; and if the output voltage is smaller than the reference voltage, the hysteresis comparator outputs a logic high level to turn on the power conversion circuit.

Another aspect of the present disclosure provides a method for operating a silicon-controlled rectifier (SCR) current-protection circuit with an SCR detection circuit and a protection circuit. A first terminal of the SCR detection circuit is connected to a current sampling point on an output terminal of an SCR device; a second terminal of the SCR detection circuit is connected to a power conversion circuit; a third terminal of the SCR detection circuit is connected to a first terminal of the protection circuit; and a second terminal of the protection is connected to the power conversion circuit.

The method includes: when the SCR device is connected to the SCR current-protection circuit, the SCR detection circuit detecting an electric current flowing through the current sampling point, converting the electric current to a voltage, and output the voltage to the protection circuit; and the protection circuit comparing the voltage to a reference voltage. If the voltage is greater than the reference voltage, the protection circuit controls the power conversion circuit to stop power conversion functions, and if the voltage is smaller than the reference voltage, the protection circuit controls the power conversion circuit to start power conversion functions.

Optionally, the method further includes: when the SCR device is connected to the SCR current-protection circuit, the current-voltage conversion circuit sampling an electric current flowing through the current sampling point, converting the electric current to a voltage, outputting the voltage to the voltage-peak processing circuit; and the voltage-peak processing circuit performing a peak-processing process on the voltage and outputting a processed voltage to the protection circuit.

Optionally, the method further includes: when the SCR device is connected to the SCR current-protection circuit, the temperature sampling circuit sampling a temperature of the first resistor, calculating a voltage applied on the first resistor based on the temperature of the first resistor, and outputting the voltage to the voltage-peak processing circuit.

Optionally, the protection circuit including a voltage-sampling circuit and a hysteresis comparator. The voltage-sampling circuit sampling and calculating a voltage outputted by the voltage-peak processing circuit to obtain an output voltage. The hysteresis comparator comparing the output voltage to the reference voltage. If the output voltage is greater than the reference voltage, the hysteresis comparator outputs a logic low level to turn off the power conversion circuit; and if the output voltage is smaller than the reference voltage, the hysteresis comparator outputs a logic high level to turn on the power conversion circuit.

Optionally, the method further includes: when the SCR device is connected to the SCR current-protection circuit, the current sensor sampling an electric current flowing through the current sampling point, converting the electric current to a voltage, and outputting the voltage to the protection circuit.

Optionally, the method further includes: the voltage-sampling circuit sampling and calculating a voltage outputted by the detection circuit to obtain an output voltage; and the hysteresis comparator comparing the output voltage to the reference voltage; if the output voltage is greater than the reference voltage, the hysteresis comparator outputting a logic low level to turn off the power conversion circuit; and if the output voltage is smaller than the reference voltage, the hysteresis comparator outputting a logic high level to turn on the power conversion circuit.

Another aspect of the present disclosure provides a dimming circuit. The dimming circuit includes a power supply circuit, a silicon-controlled rectifier (SCR) device, a power conversion circuit, an SCR current-protection circuit, the power supply circuit being connected to a terminal of the SCR device, another terminal of the SCR device being connected to a first terminal of the SCR current-protection circuit, a second terminal of the SCR current-protection circuit being connected to a first terminal of the power conversion circuit, a third terminal of the SCR current-protection circuit being connected to a second terminal of the power conversion circuit.

Optionally, the SCR device is an SCR dimmer.

Another aspect of the present disclosure provides a lighting system, including the dimming circuit according to claim 16 and one or more lighting devices connected to the dimming circuit. Optionally, the one or more lighting devices including one or more LED lighting devices.

BRIEF DESCRIPTION OF THE DRAWINGS

The following drawings are merely examples for illustrative purposes according to various disclosed embodiments and are not intended to limit the scope of the present disclosure.

FIG. 4b illustrates an exemplary temperature-sampling module used in the SCR current-protection circuit shown in FIG. 4a;

FIG. 5a illustrates an exemplary wave-function diagram of current at sampling point A2 shown in FIG. 4a;

FIG. 5b illustrates an exemplary wave-function diagram of voltage at sampling point A2 shown in FIG. 4a;

FIG. 13 illustrates an exemplary process flow of the operating method for the SCR current-protection circuit consistent with various disclosed embodiments.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
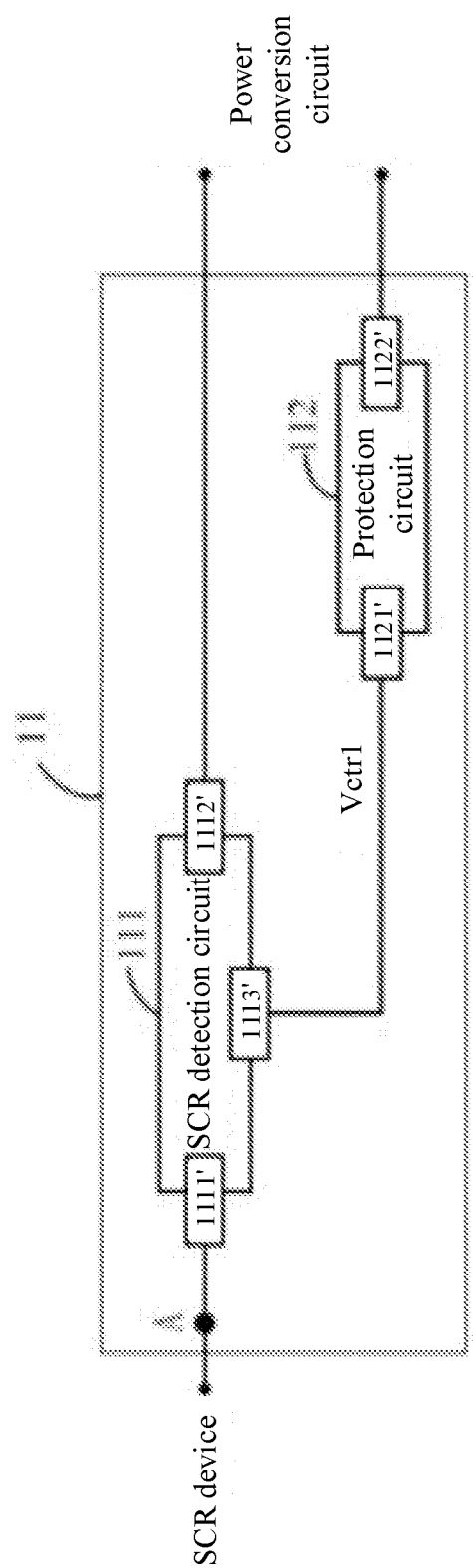
FIG. 1 illustrates a block diagram of an exemplary SCR current-protection circuit consistent with various disclosed embodiments.

FIG. 1 illustrates the working principle of an exemplary SCR current-protection circuit. As shown in FIG. 1, the SCR current-protection circuit 11 provided by the present disclosure may include an SCR detection circuit 111 and a protection circuit 112. The first terminal 1111' of the SCR detection circuit 111 may be connected to a current sampling point A on the output terminal of the SCR device. The second terminal 1112' of the SCR detection circuit 111 may be connected to a power conversion circuit. The third terminal 1113' of the SCR detection circuit 111 may be connected to the first terminal 1121' of the protection circuit 112. The second terminal 1122' of the protection circuit 112 may be connected to the power conversion circuit.

The SCR detection circuit 111 may be configured to detect the current flowing through the current sampling point A, convert the detected current to voltage, and output the converted voltage to the protection circuit 112 when the SCR device is connected to circuit incorporating the SCR current-protection circuit 11, the power conversion circuit, and the loads. The protection circuit 112 may be configured to control the on and off states of the power conversion circuit based on the converted voltage. In the present disclosure, "the circuit incorporating the SCR current-protection circuit, the power conversion circuit, and the loads" may generally refer to any suitable circuit applying the SCR current-protection circuit to protect the loads and may be referred as "the circuit" for simplicity. For example, the circuit may refer to a dimming circuit incorporating the SCR current-protection circuit to protect the LED lighting device connected to the power conversion circuit as a load. Further, when a SCR device is connected to or incorporated by the circuit, the SCR device is connected to the SCR current-protection circuit.

In one embodiment, the SCR device may include an SCR. For a conventional SCR device, after connected into dimming circuit, the SCR device may be connected to the power conversion circuit directly. Loads, e.g., LED lighting devices, may be connected to the power conversion circuit directly.

The power conversion circuit may be configured for power conversion. For example, the power conversion circuit may be a DC (direct current)-DC power supply module or an AC-DC power supply module, such as various kinds of adaptors and/or related circuits and devices. In one embodiment, the SCR device may be a TRIode AC semiconductor switch (TRIAC, also known as bidirectional thyristor). It should be noted that, the SCR device may also be other suitable types of SCR devices. The current-protection circuit 11 may include the SCR detection circuit 111 and the protection circuit 112. The SCR detection 111 may be connected in series between the SCR device and the power conversion circuit. The protection circuit 112 may be connected in series between the third terminal 1113 of the SCR detection circuit 111 and the power conversion circuit. The power conversion circuit may be a suitable device that applies flyback or forward conversion to convert power. Loads such as various home appliances and/or other circuits, e.g., LED lighting devices, may be connected to the power conversion circuit.

In the present disclosure, a current sampling point A may be arranged between the SCR device and the power conversion circuit, and an SCR detection circuit 111 may be connected in series between the current sampling point A and the power conversion circuit. When the SCR device is connected to the circuit, abrupt changes in voltage may occur because of chopping of voltage inputted into the circuit. The SCR detection circuit 111 may detect the generated abrupt current changes caused by the chopped voltage, convert the current to voltage, and output the voltage to the protection circuit 112. Thus, the protection circuit 112 may determine the operation i.e., the on and off states, of the power conversion based on the voltage outputted by the SCR detection circuit 111. That is, the SCR detection circuit 111 may determine whether to provide the protection circuit 112 for the loads. In one embodiment, the protection circuit 112 may be configured to control the on and off states of the power conversion circuit based on the magnitude of the outputted voltage.

According to the disclosed SCR current-protection circuit, by disposing an SCR detection circuit and a protection circuit between the SCR device and the power conversion circuit, abrupt changes in current caused by abrupt changes in voltage in the SCR device may be detected. By controlling the on and off states of the power conversion circuit through the protection circuit, loads connected to the power conversion circuit would not be damaged by the abrupt changes in voltage after being protected by the protection circuit.

Figure 2:
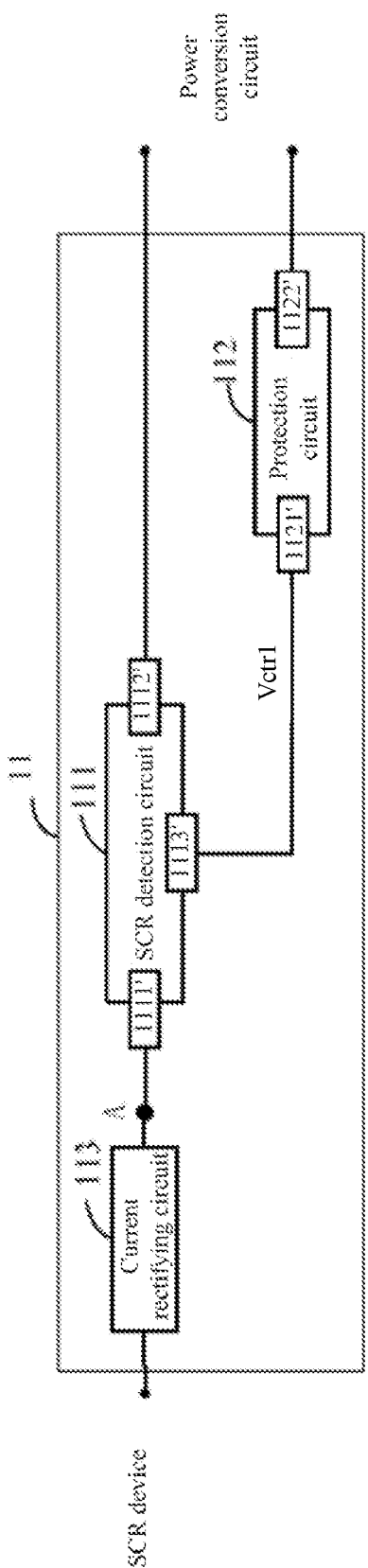
FIG. 2 illustrates a block diagram of another exemplary SCR current-protection circuit consistent with various disclosed embodiments.

FIG. 2 illustrates the working principles of another exemplary SCR current-protection circuit. As shown in FIG. 2, based on the SCR current-protection circuit shown in FIG. 1, the SCR current-protection circuit 11 may further include a current rectifying circuit 113. The current rectifying circuit 113 may be connected between the current sampling point A and the SCR device to rectify the current outputted by the SCR device to the current sampling point A.

Figure 3:
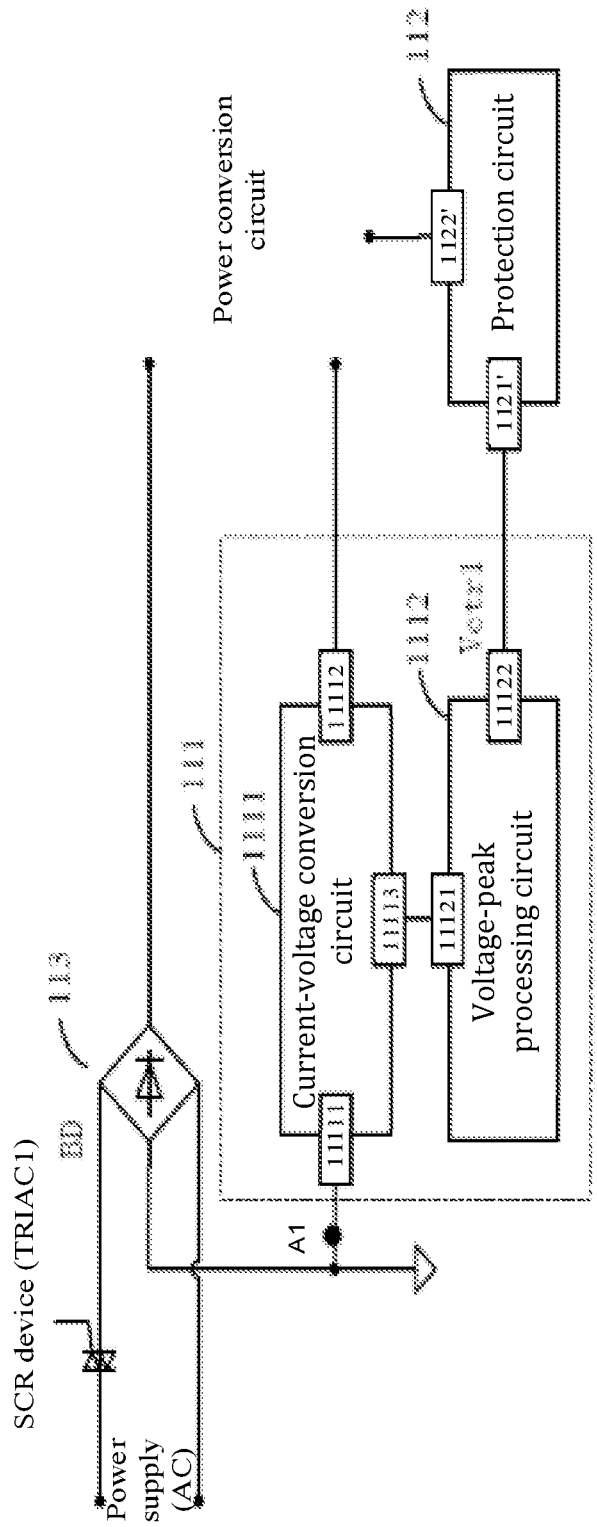
FIG. 3 illustrates a block diagram of another exemplary SCR current-protection circuit consistent with various disclosed embodiments.

FIG. 3 illustrates the working principles of another exemplary SCR current-protection circuit. As shown in FIG. 3, based on the SCR current-protection circuits exemplified in FIGS. 1 and 2, the current rectifying circuit 113 may be a diode rectifier bridge BD, the current sampling point may be A1. The SCR detection circuit 111 may include a current-voltage conversion circuit 1111 and a voltage-peak processing circuit 1112. The first terminal 11111 of the current-voltage conversion circuit 1111 may be connected with the current sampling point A1. The second terminal 11112 of the current-voltage circuit 1111 may be connected to the power conversion circuit. The third terminal 11113 of the current-voltage conversion circuit 1111 may be connected with the first terminal 11121 of the voltage-peak processing circuit 1112. The second terminal 11122 of the voltage-peak processing circuit 1112 may be connected to the first terminal 1121' of the protection circuit 112. The second terminal 1122' of the protection circuit 112 may be connected to the power conversion circuit.

The voltage-current conversion circuit 1111 may be configured to detect the current flowing through the current sampling point A1 when the SCR device is connected to the circuit. The voltage-current conversion circuit 1111 may also convert the detected current to voltage and output the voltage to the voltage-peak processing circuit 1112. The voltage-peak processing circuit 1112 may perform a peak-processing process on the outputted voltage and output the processed voltage to the protection circuit 112.

In one embodiment, in practice, one terminal of the power supply may be connected to one terminal of the SCR device, and the other terminal of the power supply may be connected to the first terminal of the rectifying circuit 113. The other terminal of the SCR device may be connected to the second terminal of the rectifying circuit 113. The first output terminal of the rectifying circuit 113 may be connected to the power conversion circuit. The second output terminal of the rectifying circuit 113 may be connected to a logic low level and the current-voltage conversion circuit, respectively. The current sampling point A1 may be arranged between the second output terminal of the rectifying circuit 113 and the first terminal 11111 of the current-voltage conversion circuit 1111.

In some embodiments, the rectifying circuit 113 may be a diode rectifier bridge BD, the power supply may be an AC voltage source, and the SCR device may be a TRIAC (shown as TRIAC1 in FIG. 3). One terminal of the power supply may be connected to the one terminal of the SCR device. The other terminal of the power supply may be connected to the first input terminal of the diode rectifier bridge BD. The other terminal of the SCR device may be connected to the second input terminal of the diode rectifier device BD. The first output terminal of the diode rectifier bridge BD may be connected to the power conversion circuit, and the second output terminal of the diode rectifier bridge BD may be connected to a logic low level and current-voltage conversion circuit 1111, respectively. The current sampling point A1 may be arranged between the second terminal of the diode rectifier bridge BD and the current-voltage conversion circuit 1111.

The voltage-peak processing circuit 1112 may be configured to perform a peak-processing process on the voltage outputted by the current-voltage conversion circuit 1111, and output a processed voltage, e.g., Vctr1 in FIG. 3, to the protection circuit 112. The protection circuit 112 may compare the processed voltage to a reference voltage and control the on and off states of the power conversion circuit based on the result of the comparison.

According to the disclosed SCR current-protection circuit, the SCR detection circuit may convert the current flowing through the current sampling point to voltage, and perform a peak-processing process on the voltage to obtain a processed voltage. The protection circuit may compare the processed voltage to a reference voltage. When the processed voltage is higher or greater than the reference voltage, the protection circuit may control the power conversion circuit to stop power conversion functions. When the processed voltage is lower or smaller than the reference voltage, the protection circuit may control the power conversion circuit to start power conversion functions, so that the SCR device may be incorporated into the circuit, such as a dimming circuit, with improved safety and reliability. The SCR current-protection circuit may thus better protect the modules and components in the circuit, and prevent the related dimming circuit and LED lighting devices from being damaged when the SCR device is connected into the circuit. The SCR device may control the circuit with improved safety and reliability.

Figure 4A:
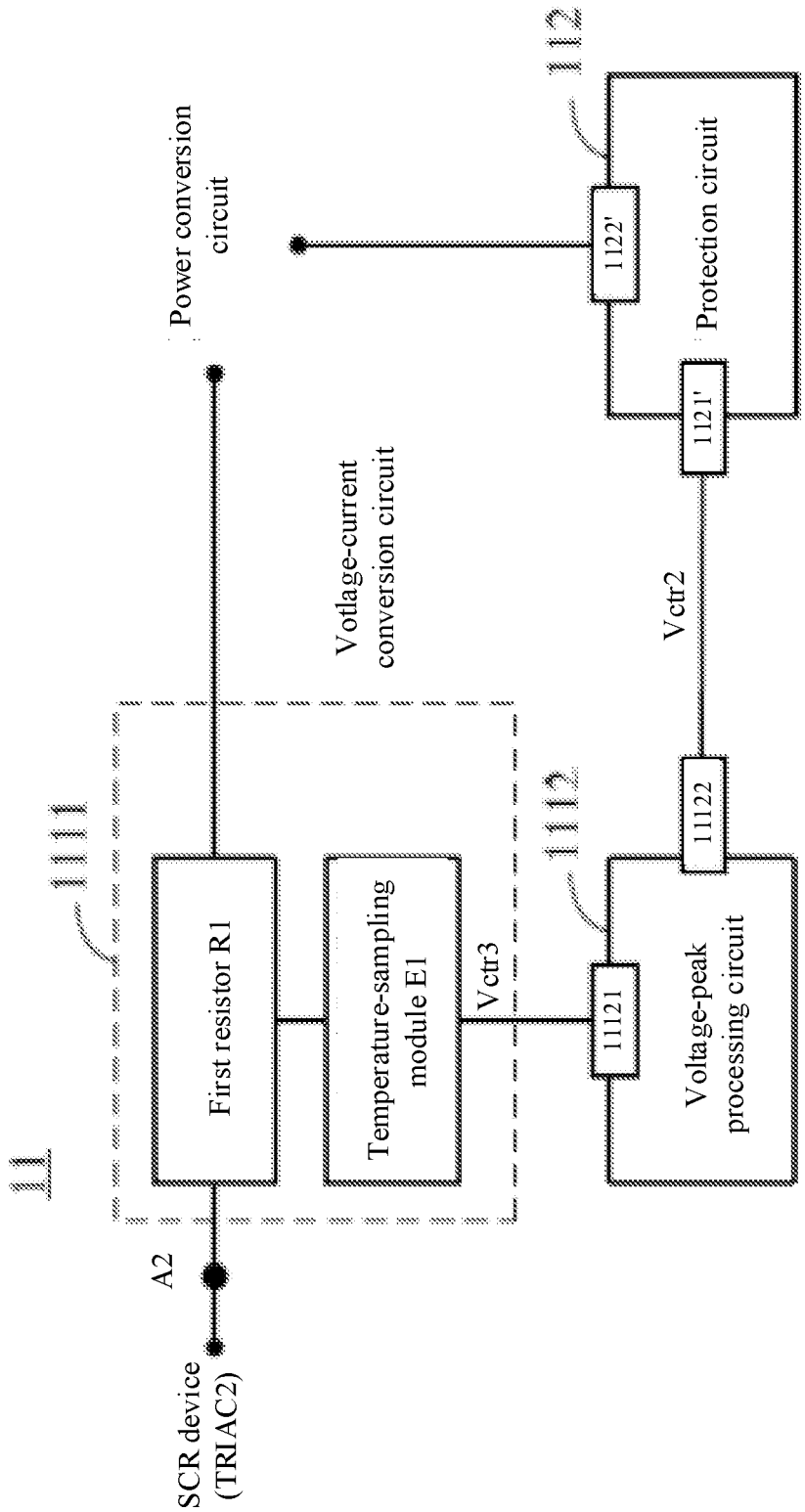
FIG. 4a illustrates a block diagram of another exemplary SCR current-protection circuit consistent with various disclosed embodiments.

FIG. 4a illustrates the working principle of another exemplary SCR current-protection circuit. As shown in FIG. 4a, based on the embodiments described above, the current-protection circuit 11 may include a current sampling point A2 between the SCR device and the current-voltage conversion circuit 1111. The current-voltage conversion circuit 1111 may include a first resistor R1 and a temperature-sampling module E1. One terminal of the first resistor R1 may be connected to the current sampling point $A_2$, and the other terminal of the first resistor R1 may be connected to the power conversion circuit. The temperature-sampling module E1 may be arranged to be on the first resistor R1 or to be incorporated in the first resistor R1. The temperature-sampling module E1 may be connected to the first terminal 11121 of the voltage-peak processing circuit 1112. The temperature-sampling module E1 may be configured to sample the temperature of the first resistor R1 when the SCR device is connected to the circuit. The temperature-sampling module E1 may further calculate the voltage applied on the first resistor R1 based on the temperature of the first resistor R1, and output the calculated voltage to the voltage-peak processing circuit 1112.

Figure 4B:
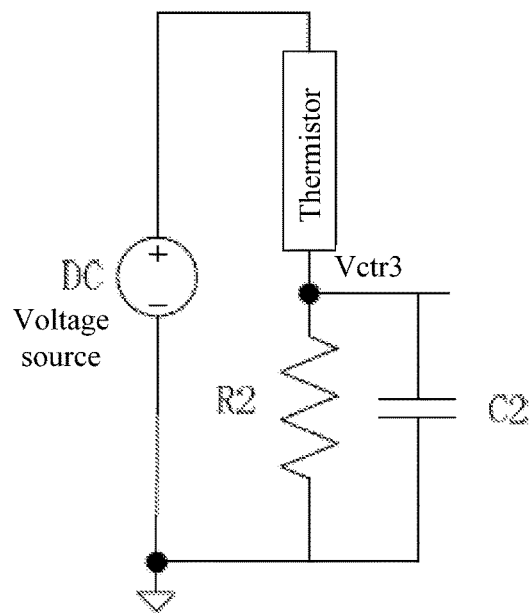

In one embodiment, FIG. 4b illustrates the working principles of the temperature-sampling module E1 used in the current-protection circuit 111 shown in FIG. 4a. As shown in FIGS. 4a and 4b, in one embodiment, the current-voltage conversion circuit 1111 may include the temperature-sampling module E1 and the first resistor R1, where the first resistor R1 may be connected in series between the SCR device, e.g., a TRIAC (shown as TRIAC2 in FIG. 4a), and the power conversion circuit. The temperature-sampling module E1 may sample the temperature of the first resistor R1 and convert the sampled temperature to a voltage signal. Because the heat generated by a resistor is proportional to the square of the effective current value flowing through the resistor, the effective value of the input current of the first resistor R1 may be detected by sampling the temperature of the first resistor R1. Specifically, the temperature-sampling module E1 may include but not limited to a thermistor.

Figure 5A:
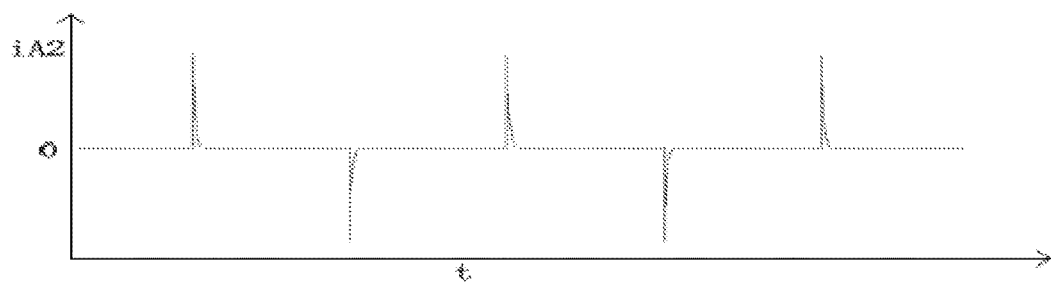
Figure 5B:
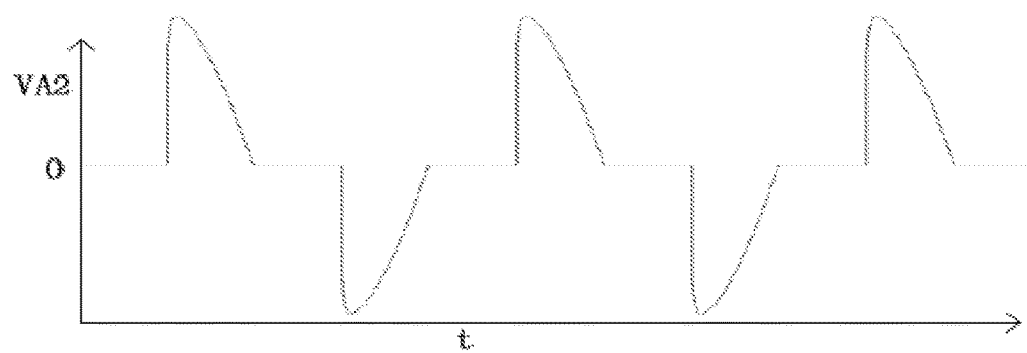
Figure 5C:
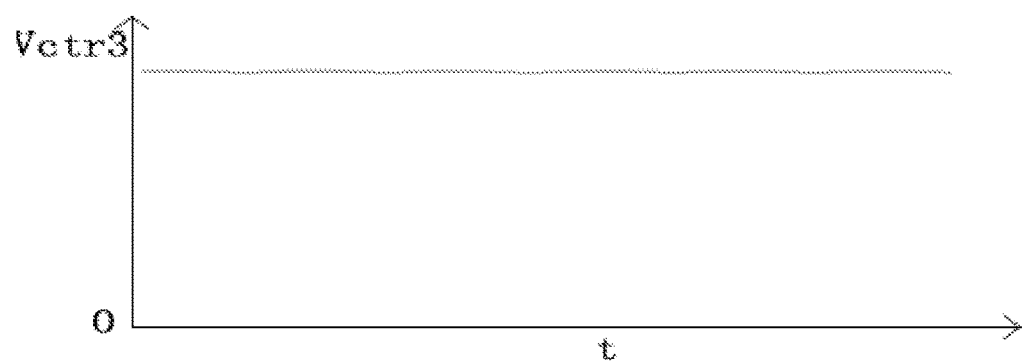
FIG. 5c illustrates an exemplary wave-function diagram of voltage Vctr3 in FIGS. 4a and 4b.

As shown in FIG. 4b, in one embodiment, the temperature-sampling module E1 and voltage-peak processing circuit 1112 may include a DC voltage source DC, a thermistor, a resistor R2, and a capacitor C2. The thermistor may be connected in series with the DC voltage source. The resistor R2 may be connected in parallel with the capacitor C2. The resistor R2 and the capacitor C2 may be further connected in series with the thermistor. The thermistor may be used to sample the temperature of the first resistor R1 and convert the sampled temperature to a voltage signal to implement current detection functions. Specifically, the temperature probe of the thermistor may be directly placed on the first resistor R1. As the resistance of the thermistor changes with temperature, the voltage Vctr3 may change according to the temperature change of the first resistor R1. Because the temperature of the first resistor R1 changes according to the effective value of the input current of the first resistor R1, the change of Vctr3 may reflect the change in the effective value of the input current. FIG. 5b illustrates the wave-function diagram of current flowing through the current sampling point A2 after the SCR device is connected to the circuit. FIG. 5c illustrates the wave-function diagram of voltage applied on the current sampling point A2 after the SCR device is connected to circuit. FIG. 5c illustrates the wave-function diagram of the voltage of Vctr3. In FIGS. 5a-5c, the X axis t represents time. The Y axis iA2 represents the current flowing through the current sampling point A2. The Y axis VA2 represents the voltage applied on the current sampling point A2. The Y axis Vctr3 represents the voltage of Vctr3 in FIGS. 4a-4b.

Figure 6:
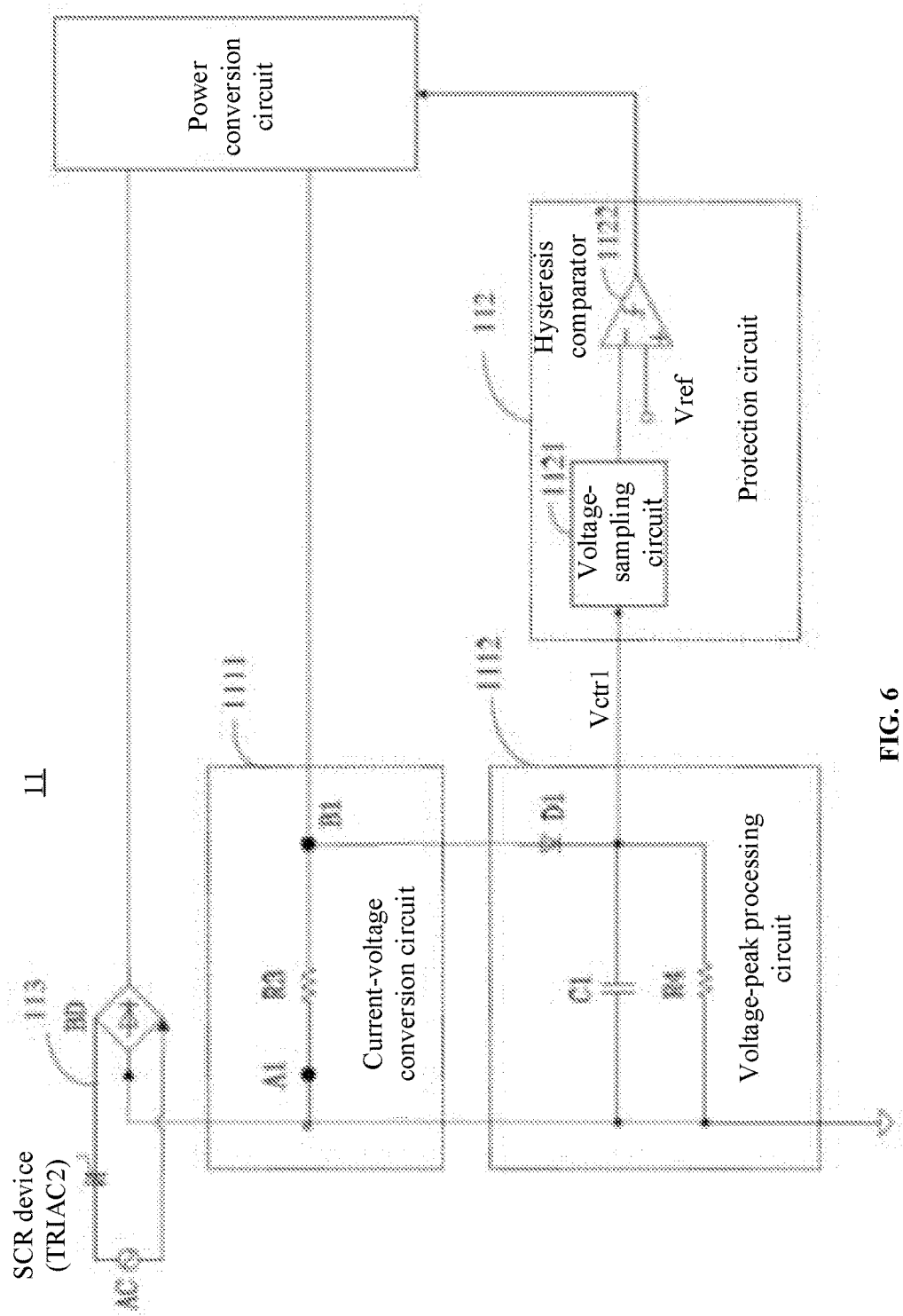
FIG. 6 illustrates a block diagram of another exemplary SCR current-protection circuit consistent with various disclosed embodiments.

FIG. 6 illustrates the working principles of another exemplary SCR current-protection circuit. As shown in FIG. 6, based on previous embodiments, the protection circuit 112 of the SCR current-protection circuit 11 shown may include a voltage-sampling circuit 1121 and a hysteresis comparator 1122. The first terminal of the voltage voltage-sampling circuit 1121 may be connected to the second terminal of the voltage-peak processing circuit 1112. The second terminal of the voltage-peak processing circuit 1112 may represent the terminal of the voltage-peak processing circuit 1112 that outputs Vctr1 in FIG. 6. The second terminal of the voltage-sampling circuit 1121 may be connected to the first input terminal of the hysteresis comparator 1122. The second input terminal of the hysteresis comparator 1122 may be configured to input a reference voltage Vref. The output terminal of the hysteresis comparator 1122 may be connected to the power conversion circuit. The voltage-sampling circuit 1121 may be configured to sample and calculate the voltage outputted by the voltage-peak processing circuit 1112 and output a calculated voltage. The hysteresis comparator 1122 may compare the calculated voltage with the reference voltage Vref. If the calculated voltage is higher or greater than the reference voltage Vref, the hysteresis comparator 1122 may output a logic low level to turn off the power conversion circuit. If the calculated voltage is lower or smaller than the reference voltage Vref, the hysteresis comparator 1122 may output a logic high level to turn on the power conversion circuit.

Figure 7A:
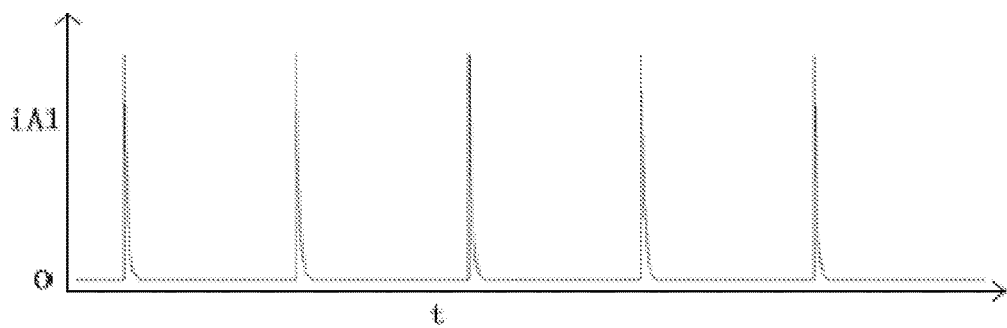
FIG. 7a illustrates an exemplary wave-function diagram of current at sampling point A1 shown in FIG. 6.
Figure 7B:
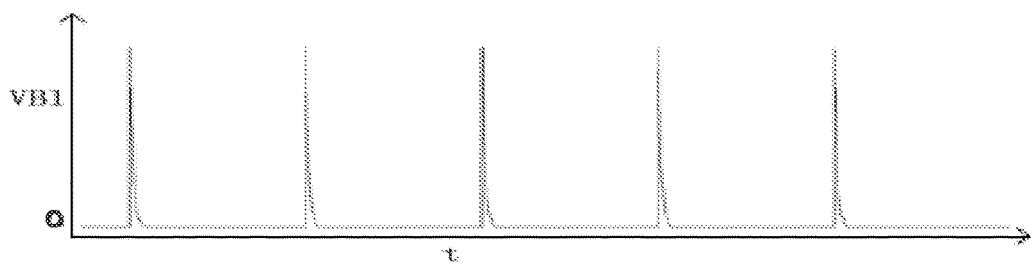
FIG. 7b illustrates an exemplary wave-function diagram of voltage at sampling point B1 shown in FIG. 6.

In one embodiment, the current sampling point A1 may be arranged between the second output terminal of the diode rectifier bridge BD and the power conversion circuit. FIG. 7a illustrates the wave-function diagram of the current flowing through the current sampling point A1 after the SCR device is connected to the circuit. As shown in FIG. 7a, the X axis t represents time, and the Y axis iA1 represents the current flowing through the current sampling point A1. Specifically, the current-voltage conversion circuit may be a resistor R3 connected in series between the SCR device, e.g., a TRIAC (shown as TRIAC1 in FIG. 6), and the power conversion circuit. The voltage applied on the resistor R3 may be sampled for detecting the current flowing through the current sampling point A1, i.e., the input current of the current sampling point A1. FIG. 7b illustrates the wave-function diagram of the voltage applied on the point B1, shown in FIG. 6, after the SCR device is connected to the circuit. As shown in FIG. 7b, the X axis t represents time, and the Y axis VB1 represents the voltage at point B1.

Figure 7C:
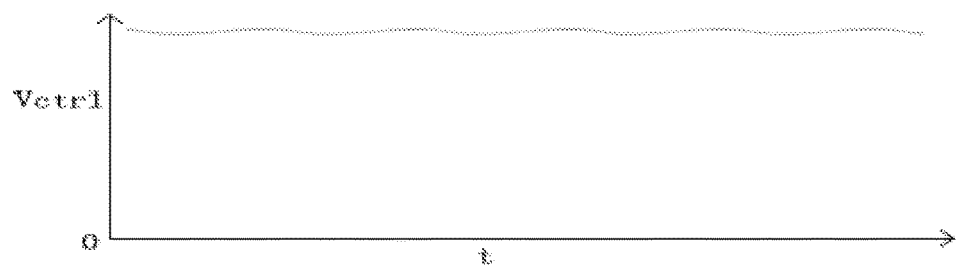
FIG. 7c illustrates an exemplary wave-function diagram of voltage Vctr1 in FIG. 6.

The voltage-peak processing circuit 1112 may be connected in parallel with the resistor R3, and may perform a peak-processing process on the voltage applied on the resistor R3. In some embodiments, the voltage-peak processing circuit 1112 may include a capacitor C1, a resistor R4, and a diode D1. The capacitor C1 may be connected in parallel with the resistor R4, and the capacitor C1 and the resistor R4 may further be connected in series with the cathode of the diode D1. The anode of the diode D1 may be connected to the point B1. The voltage-peak processing circuit may output the processed voltage signal Vctr1 to the protection circuit 112. FIG. 7c illustrates the wave-function diagram of the voltage Vctr1 shown in FIG. 6. As shown in FIG. 7c, the X axis t represents time, and the Y axis represents the voltage of Vctr1. In some embodiments, the protection circuit 112 may include a voltage-sampling circuit 1121 and a hysteresis comparator 1122. The voltage-sampling circuit 1121 may be configured to sample the voltage outputted by the voltage-peak processing circuit 1112 for a plurality of times and output an average voltage value. The hysteresis comparator 1122 may be connected to the voltage-sampling circuit 1121 to compare the average voltage value to a reference voltage Vref. If the average voltage value is greater or higher than the reference voltage Vref, the hysteresis comparator 1122 may output a logic low level to turn off the power conversion circuit, so that the power conversion circuit would stop power conversion functions. If the average voltage value is lower or smaller than the reference voltage Vref, the hysteresis comparator 1122 may output a logic high level to turn on the power conversion circuit, so that the power conversion circuit would start power conversion functions.

The SCR current-protection circuit provided by the present disclosure may be simple to implement and reliable. By detecting the input current flowing through the current sampling point, converting the detected current to voltage, performing a peak-processing process on the voltage to obtain a processed voltage, and comparing the processed voltage with the reference voltage, the value of the input current of the SCR current-protection circuit may be detected. The protection circuit may control the on and off states of the power conversion circuit based on the result of the comparison. The SCR device may be incorporated into circuits such as dimming circuits. Modules and components in the circuits may be better protected, and the dimming circuits and/or LED lighting devices may be protected from being damaged when the SCR device is connected to the circuits.

Figure 8:
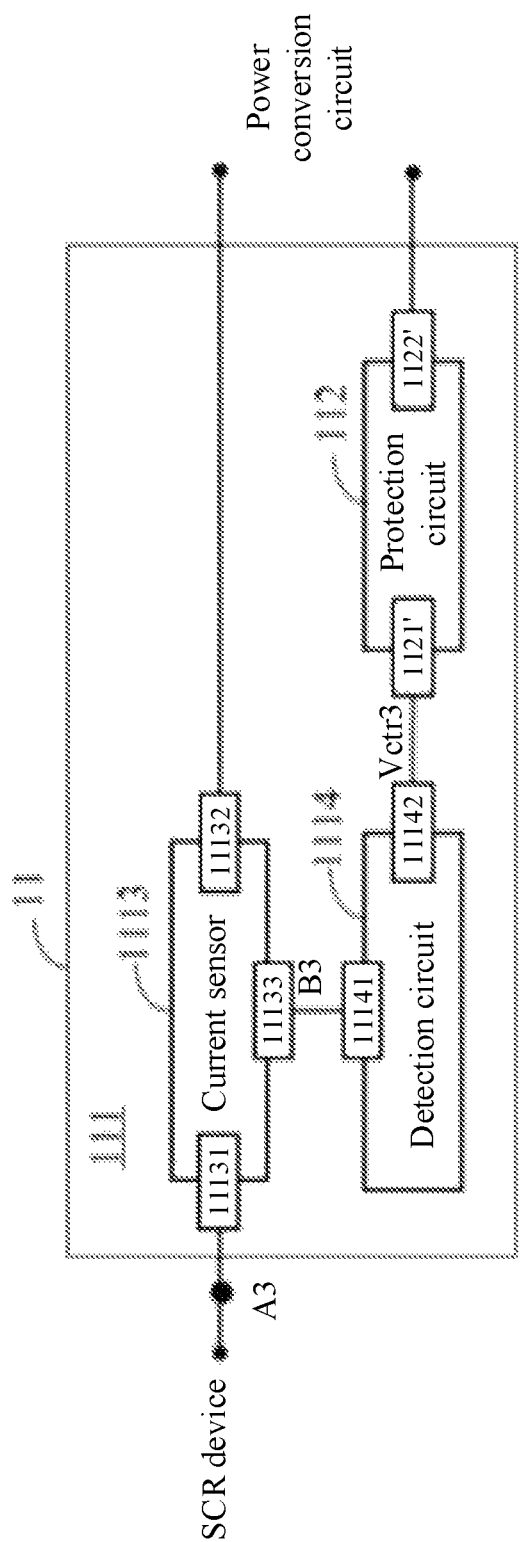
FIG. 8 illustrates a block diagram of another exemplary SCR current-protection circuit consistent with various disclosed embodiments.

FIG. 8 illustrates the working principles of another exemplary SCR current-protection circuit provided by the present disclosure. As shown in FIG. 8, based on the previous embodiments, the SCR current-protection circuit 11 shown in FIG. 8 may include a current sampling point A3. The SCR detection circuit 111 may include a current sensor 1113 and a detection circuit 1114. The first terminal 11131 of the current sensor 1113 may be connected to the current sampling point A3. The second terminal 11132 of the current sensor may be connected to the power conversion circuit. The third terminal 11133 of the current sensor 1113 may be connected to the first terminal 11141 of the detection circuit 1114. The second terminal 11142 of the detection circuit 1114 may be connected to the protection circuit 112. The current sensor 1113 may be configured to detect the current flowing through the current sampling point A3 when the SCR device is connected to the circuit. The detection circuit 1114 may be configured to convert the detected current to voltage and output the converted voltage to the protection circuit 112.

Figure 9:
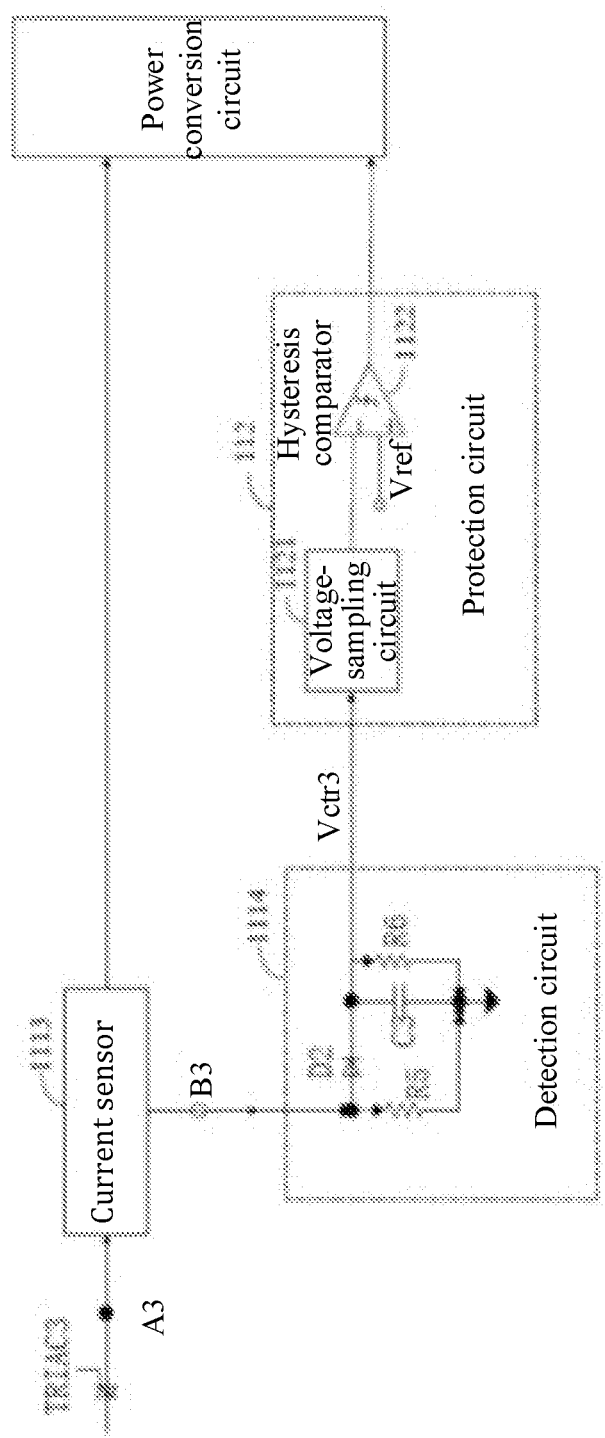
FIG. 9 illustrates a block diagram of another exemplary SCR current-protection circuit consistent with various disclosed embodiments.

FIG. 9 illustrates the working principles of another exemplary SCR current-protection circuit provided by the present disclosure. As shown in FIG. 9, based on the embodiment shown in FIG. 8, the protection circuit 112 of the SCR current-protection circuit 11 shown in FIG. 9 may include a voltage-sampling circuit 1121 and a hysteresis comparator 1122. The first terminal of the voltage sampling circuit 1121 may be connected to the second terminal of the detection circuit 1114, where the voltage at the connection point is shown as Vctr3 in FIG. 9. The second terminal of the voltage-sampling circuit 1121 may be connected to the first input terminal of the hysteresis comparator 1122. The second input terminal of the hysteresis comparator 1122 may be configured to input a reference voltage Vref. The output terminal of the hysteresis comparator 1122 may be connected to the power conversion circuit. The voltage-sampling circuit 1121 may be configured to sample and calculate the voltage outputted by the detection circuit 1114 to obtain an output voltage. The hysteresis comparator 1122 may be configured to compare the output voltage to the reference voltage Vref. If the output voltage value is greater or higher than the reference voltage Vref, the hysteresis comparator 1122 may output a logic low level to turn off the power conversion circuit, so that the power conversion circuit would stop power conversion functions. If the output voltage value is lower or smaller than the reference voltage Vref, the hysteresis comparator 1122 may output a logic high level to turn on the power conversion circuit, so that the power conversion circuit would start power conversion functions.

In one embodiment, different from other disclosed SCR current-protection circuits described previously, the SCR detection circuit 111 of the SCR current-protection circuit shown in FIG. 8 or 9 may include a current sensor 1113. The current sensor 1113 may be connected in series between the SCR device, e.g., a TRIAC (shown as TRIAC3 in FIG. 9), and the power conversion circuit. The current sensor 1113 may be configured to sample the current flowing from the SCR device to the power conversion circuit. To detect the current flowing through the current sampling point A3 after the SCR device is connected to the circuit, the current sensor 1113 may be connected between the current sampling point A3 and the power conversion circuit. The current sensor 1113 may sample the current flowing through the current sampling point A3 and output a new current. The value of the new current may be proportional to the value of the current flowing through the current sampling point A3. A new current sampling point B3 may be arranged between the current sensor 1113 and the detection circuit 1114 for detecting the new current. The detection circuit 1114 may perform a current-voltage conversion on the new current and a peak-processing process on the converted voltage. That is, the current outputted by the current sensor 1113 may be processed by the detection circuit 1114, and the detection circuit 1114 may output a voltage signal Vctr3.

Figure 10A:
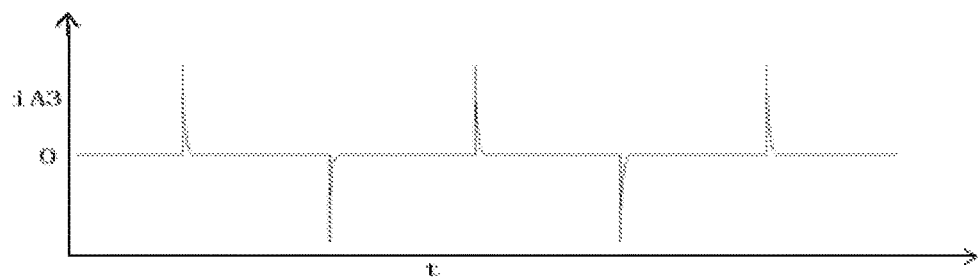
FIG. 10a illustrates an exemplary wave-function diagram of current at sampling point A3 shown in FIG. 9.
Figure 10B:
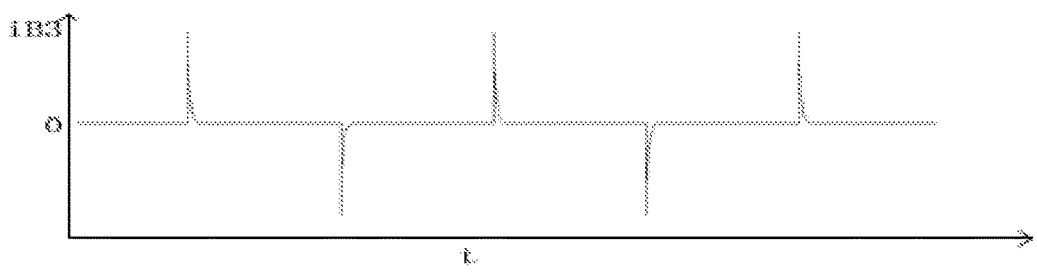
FIG. 10b illustrates an exemplary wave-function diagram of voltage at sampling point B3 shown in FIG. 9.
Figure 10C:
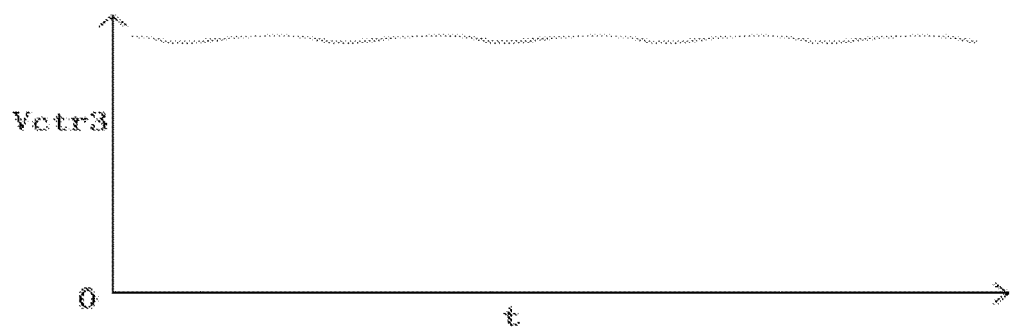
FIG. 10c illustrates an exemplary wave-function diagram of voltage Vctr3 in FIG. 9.

In one embodiment, the detection circuit 1114 may include a diode D2, a resistor R5, a capacitor C3, and a resistor R6, as shown in FIG. 9. The resistor R5, the capacitor C3, and the resistor R6 may be connected in parallel with each other. The diode D2 may be connected in series between the resistor R5 and the capacitor C3, and the voltage outputted by the diode D2 may be the voltage Vctr3. As shown in FIG. 9, the current flowing through point B3 may be converted by the detection circuit 1114 to obtain the voltage Vctr3. The voltage Vctr3 may be outputted to the protection circuit 112. FIG. 10a illustrates the wave-function diagram of the current flowing through the current sampling point A3 after the SCR device is connected to circuit. As shown in FIG. 10a, the X axis t represents time, and the Y axis iA3 represents the current flowing through the current sampling point A3. FIG. 10b illustrates the wave-function diagram of the current flowing through the output terminal B3 of the current detector after the SCR device is connected to the SCR current-protection circuit 11. As shown in FIG. 10b, the X axis t represents time, and the Y axis iB3 represents the current flowing through the output terminal B3 of the current detector. FIG. 10c illustrates the wave-function diagram of the voltage of Vctr3. As shown in FIG. 10c, the X axis t represents time, and the Y axis Vctr3 represents the voltage signal Vctr3 after the peak-processing process performed by the detection circuit 1114.

According to the SCR current-protection circuit provided by the present disclosure, a current sensor may be disposed to detect the value of input current. A detection circuit may be used to convert the detected current to voltage and perform a peak-processing process on the voltage. By comparing the processed voltage to a reference voltage, the protection circuit may determine the value of the input current. The protection circuit may further control the on and off states of the power conversion circuit based on the result of the comparison. Thus, the SCR device may be incorporated into the circuit, e.g., a dimming circuit, with improved safety and reliability. The SCR device may better protect the modules and components in the circuit, and prevent the dimming circuit and/or the loads, e.g., LED lighting devices, to be damaged.

Figure 11:
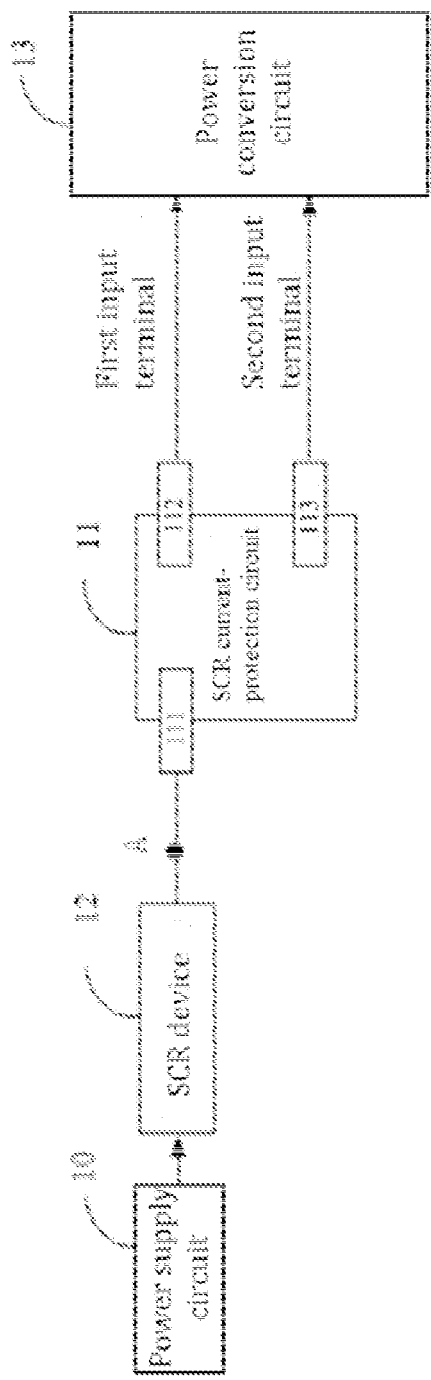
FIG. 11 illustrates an exemplary dimming circuit consistent with various disclosed embodiments.

FIG. 11 illustrates the working principles of an exemplary dimming circuit incorporating the SCR current-protection circuit. As shown in FIG. 11, the dimming circuit may include a power supply circuit 10, an SCR dimmer 12, a power conversion circuit 13, and an SCR current-protection circuit 11 described in any one of the embodiments shown in FIGS. 1-9. The SCR dimmer 12 may exemplify or may be included in the SCR device shown in the embodiments shown in FIGS. 1-9. The power supply circuit 10 may be connected to one terminal of the SCR dimmer 12. The other terminal of the SCR dimmer 12 may be connected to the first terminal 111 of the SCR current-protection circuit 11. The second terminal 112 of the SCR current-protection circuit 11 may be connected to the first input terminal of the power conversion circuit 13. The third terminal 113 of the SCR current-protection circuit 11 may be connected to the second input terminal of the power conversion circuit 13.

The embodiment shown in FIG. 11 provides a dimming circuit incorporating an SCR current-protection circuit. The power conversion circuit 13 may be configured to perform power conversion functions. The power conversion circuit 13 may be a DC-DC power supply circuit or an AC-DC power supply circuit, such as various adapters and/or other suitable circuits and devices. The SCR dimmer 12 may include an SCR device. In one embodiment, the SCR device may be a TRIAC. It should be noted that, the SCR dimmer 12 may include but not limited to other suitable SCR devices.

According to the dimming circuit provided by the present disclosure, an SCR current-protection circuit may be arranged between the SCR dimmer and the power conversion circuit. When the SCR dimmer is connected to the circuit, abrupt changes in voltage may occur because of chopping of voltage. The SCR current-protection circuit may detect the abrupt changes in current and control the operation status of the power conversion circuit to protect the loads. Details of the working principles and technical effect of the SCR current-protection circuit may be referred to the embodiments described previously and are not repeated herein.

Figure 12:
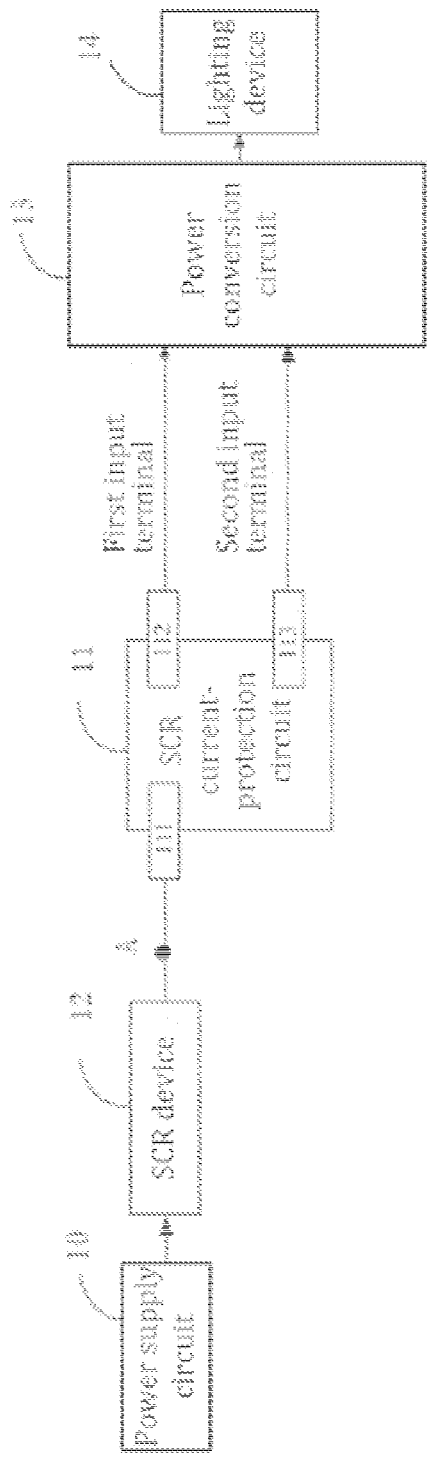
FIG. 12 illustrates an exemplary dimming circuit consistent with various disclosed embodiments.

FIG. 12 illustrates an exemplary lighting system provided by the present disclosure. As shown in FIG. 12, the lighting system may include the dimming circuit exemplified in FIG. 11 and a lighting device 14 connected with the dimming circuit. For example, the lighting device 14 may be an LED lighting device with one more LED light sources. Details of the working principles and technical effect of the SCR current-protection circuit may be referred to the embodiments described previously and are not repeated herein.

FIG. 13 illustrates an exemplary operating method for protecting the circuit incorporating the SCR current-protection circuit. As shown in FIG. 13, the method may be applied on the SCR current-protection circuit 11 described in any one of the embodiments of the present disclosure. The SCR current-protection circuit 11 may include an SCR detection circuit and a protection circuit. The first terminal 111 of the SCR detection circuit may be connected to the current sampling point A on the output terminal of the SCR device. The second terminal 112 of the SCR current-protection circuit 11 may be connected to the power conversion terminal 13. The third terminal 113 of the SCR current-protection circuit 11 may be connected to the first terminal of the protection circuit. The second terminal of the protection circuit may be connected to the power conversion circuit 13. The operating method may include steps S101 and S102.

In step S101, when the SCR device is connected to the circuit, the SCR detection circuit may detect the current flowing through the current sampling point, convert the detected current to voltage, and output the voltage to the protection circuit.

In step S102, the protection circuit may compare the processed voltage to a reference voltage. If the processed voltage is greater than the reference voltage, the protection circuit may control the power conversion circuit to stop power conversion functions. If the processed voltage is smaller than the reference voltage, the protection circuit may control the power conversion circuit to start power conversion functions.

The operating method for protecting the circuit incorporating the SCR current-protection circuit may be applied on any one of the SCR current-protection circuit illustrated in FIGS. 1-9. The operation of each module and part of the SCR current-protection circuit may be referred to the embodiments described previously in the disclosure and is not repeated herein. The loads connected to the power conversion circuit and the SCR device may be protected from being damaged. The working principles may be referred to previously described embodiments and are not repeated herein.

According to the SCR current-protection circuit, the related operating method, the dimming circuit, and the lighting device of the present disclosure, the SCR protection circuit may have improved simplicity and reliability. The value of the input current may be detected and converted to voltage. The converted voltage may be processed with a peak-processing process. The processed voltage may be compared to a reference voltage and for determining the value of the input current. The protection circuit of the SCR current-protection circuit may control the on and off states of the power conversion circuit based on the result of the comparison. The SCR device may thus be incorporated into the circuit, e.g., the dimming circuit, with improved safety and reliability. Modules and components in the circuit may be better protected. The SCR current-protection circuit may prevent the loads, e.g., dimming circuits and/or LED lighting devices, connected to the circuit from being damaged. The SCR device may thus control and adjust the circuit with improved safety and reliability.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The SCR current-protection circuit provided by the present disclosure may be simple to implement and reliable. By detecting the input current flowing through the current sampling point, converting the detected current to voltage, performing a peak-processing process on the voltage to obtain a processed voltage, and comparing the processed voltage with the reference voltage, the value of the input current of the SCR current-protection circuit may be detected. The protection circuit may control the on and off states of the power conversion circuit based on the result of the comparison. The SCR device may be incorporated into circuits such as dimming circuits. Modules and components in the circuits may be better protected, and the dimming circuits and/or LED lighting devices may be protected from being damaged when the SCR device is connected to the circuits.

According to the SCR current-protection circuit, the related operating method, the dimming circuit, and the lighting device of the present disclosure, the SCR protection circuit may have improved simplicity and reliability. The value of the input current may be detected and converted to voltage. The converted voltage may be processed with a peak-processing process. The processed voltage may be compared to a reference voltage and for determining the value of the input current. The protection circuit of the SCR current-protection circuit may control the on and off states of the power conversion circuit based on the result of the comparison. The SCR device may thus be incorporated into the circuit, e.g., the dimming circuit, with improved safety and reliability. Modules and components in the circuit may be better protected. The SCR current-protection circuit may prevent the loads, e.g., dimming circuits and/or LED lighting devices, connected to the circuit from being damaged. The SCR device may thus control and adjust the circuit with improved safety and reliability.

REFERENCE SIGN LIST

SCR current-protection circuit 11
SCR detection circuit 111
first terminal of the SCR detection circuit 1111'
second terminal of the SCR detection circuit 1112'
third terminal of the SCR detection circuit 1113'
protection circuit 112
first terminal of the protection circuit 1121'
second terminal of the protection circuit 1122'
current rectifying circuit 113
voltage-peak processing circuit 1112
first terminal of the voltage-peak processing circuit 11121
second terminal of the voltage-peak processing circuit 11122
current-voltage conversion circuit 1111
voltage-sampling circuit 1121
hysteresis comparator 1122
current sensor 1113
first terminal of the current sensor 11131
second terminal of the current sensor 11132
third terminal of the current sensor 11133
detection circuit 1114
first terminal of the detection circuit 11141
second terminal of the detection circuit 11142
power supply circuit 10
SCR device 12
power conversion circuit 13
lighting device 14

What is claimed is:

1. A silicon-controlled rectifier (SCR) current-protection circuit, comprising an SCR detection circuit and a protection circuit, a first terminal of the SCR detection circuit being connected to a current sampling point on an output terminal of an SCR device, a second terminal of the SCR detection circuit being connected to a power conversion circuit, a third terminal of the SCR detection circuit being connected to a first terminal of the protection circuit, and a second terminal of the protection circuit being connected to the power conversion circuit, wherein:
the SCR detection circuit includes a current-voltage conversion circuit and a voltage-peak processing circuit, a first terminal of the current-voltage conversion circuit is regarded as the first terminal of the SCR detection circuit, a second terminal of the current-voltage conversion circuit is regarded as the second terminal of the SCR detection circuit, a third terminal of the current-voltage conversion circuit is connected to a first terminal of the voltage-peak processing circuit, and a second terminal of the voltage-peak processing circuit is regarded as the third terminal of the SCR detection circuit;
when the SCR device is connected to the SCR current-protection circuit, the SCR detection circuit is configured to detect a current flowing through the current sampling point, the current-voltage conversion circuit of the SCR detection circuit is configured to convert the current to a voltage and output the voltage to the voltage-peak processing circuit, and the voltage-peak processing circuit is configured to perform a process on the voltage to generate a peak voltage and output the peak voltage to the protection circuit; and
the protection circuit is configured to control on and off states of the power conversion circuit based on the peak voltage.

2. The SCR current-protection circuit according to claim 1, further including a current rectifying circuit, wherein the current rectifying circuit is arranged between the current sampling point and the SCR device to rectify an electric current outputted by the SCR device and output a rectified electric current to the current sampling point.

3. The SCR current-protection circuit according to claim 1, wherein the protection circuit includes a voltage sampling circuit and a hysteresis comparator, a first terminal of the voltage-sampling circuit being connected to the second terminal of the voltage-peak processing circuit, a second terminal of the voltage-sampling circuit being connected to a first input terminal of the hysteresis comparator, a second input terminal of the hysteresis comparator being configured to input a reference voltage, and an output terminal of the hysteresis comparator being connected to the power conversion circuit, wherein:
the voltage-sampling circuit is configured to sample and calculate the peak voltage outputted by the voltage-peak processing circuit to obtain an output voltage; and
the hysteresis comparator is configured to compare the output voltage to the reference voltage.

4. The SCR current-protection circuit according to claim 3, wherein:
if the output voltage is greater than the reference voltage, the hysteresis comparator outputs a logic low level to turn off the power conversion circuit; and
if the output voltage is smaller than the reference voltage, the hysteresis comparator outputs a logic high level to turn on the power conversion circuit.

5. The SCR current-protection circuit according to claim 1, wherein the current-voltage conversion circuit includes a first resistor and a temperature sampling module, a first terminal of the first resistor being connected to the current sampling point, a second terminal of the first resistor being connected to the power conversion circuit, the temperature sampling module being arranged on the first resistor, and the temperature sampling module being connected to the first terminal of the voltage-peak processing circuit, wherein:
when the SCR device is connected to the SCR current-protection circuit, the temperature sampling circuit is configured to sample a temperature of the first resistor, calculate a voltage applied on the first resistor based on the temperature of the first resistor, and output the voltage to the voltage-peak processing circuit.

6. The SCR current-protection circuit according to claim 5, wherein the temperature sampling module comprises a thermistor coupled to the first resistor at one end, and the thermistor, at another end, outputs the voltage reflecting an input current of the first resistor as sampled based on the temperature of the first resistor.

7. The SCR current-protection circuit according to claim 1, further comprising a current sensor and a detection circuit, a first terminal of the current sensor being connected to the current sampling point, a second terminal of the current sensor being connected to the power conversion circuit, a third terminal of the current sensor being connected to a first terminal of the detection circuit, and a second terminal of the detection circuit being connected to the first terminal of the protection circuit, wherein:

when the SCR device is connected to the SCR current-protection circuit, the current sensor is configured to sample a current flowing through the current sampling point, output a new current, and the detection circuit is configured to convert the new current to a voltage, and output the voltage to the protection circuit.

8. The SCR current-protection circuit according to claim 7, wherein the protection circuit includes a voltage sampling circuit and a hysteresis comparator, a first terminal of the voltage-sampling circuit being connected to the second terminal of the detection circuit, a second terminal of the voltage-sampling circuit being connected to a first input terminal of the hysteresis comparator, a second input terminal of the hysteresis comparator being configured to input a reference voltage, and an output terminal of the hysteresis comparator being connected to the power conversion circuit, wherein:

the voltage-sampling circuit is configured to sample and calculate the voltage outputted by the detection circuit to obtain an output voltage; and the hysteresis comparator is configured to compare the output voltage to the reference voltage.

9. The SCR current-protection circuit according to claim 8, wherein:

if the output voltage is greater than the reference voltage, the hysteresis comparator outputs a logic low level to turn off the power conversion circuit; and if the output voltage is smaller than the reference voltage, the hysteresis comparator outputs a logic high level to turn on the power conversion circuit.

10. A dimming circuit, comprising a power supply circuit, a silicon-controlled rectifier (SCR) device, a power conversion circuit, an SCR current-protection circuit according to claim 1, the power supply circuit being connected to a terminal of the SCR device, another terminal of the SCR device being connected to a first terminal of the SCR current-protection circuit, a second terminal of the SCR current-protection circuit being connected to a first terminal of the power conversion circuit, a third terminal of the SCR current-protection circuit being connected to a second terminal of the power conversion circuit.

11. The dimming circuit according to claim 10, wherein the SCR device is an SCR dimmer.

12. A lighting system, comprising the dimming circuit according to claim 10 and one or more lighting devices connected to the dimming circuit.

13. The lighting system according to claim 12, the one or more lighting devices including one or more LED lighting devices.

14. The SCR current-protection circuit according to claim 1, wherein the voltage-peak processing circuit comprises a capacitor, a resistor, and a diode, wherein the capacitor is connected in parallel with the resistor, and the capacitor and the resistor are further connected in series with a cathode of the diode.

15. A method for operating a silicon-controlled rectifier (SCR) current-protection circuit with an SCR detection circuit and a protection circuit, a first terminal of the SCR detection circuit being connected to a current sampling point on an output terminal of an SCR device, a second terminal of the SCR detection circuit being connected to a power conversion circuit, a third terminal of the SCR detection circuit being connected to a first terminal of the protection circuit, a second terminal of the protection circuit being connected to the power conversion circuit; the SCR detection circuit including a current-voltage conversion circuit and a voltage-peak processing circuit, the method comprising:

when the SCR device is connected to the SCR current-protection circuit, the current-voltage conversion circuit of the SCR detection circuit detecting and sampling a current flowing through the current sampling point, the current-voltage conversion circuit further converting the current to a voltage and outputting the voltage to the voltage-peak processing circuit;

the voltage-peak processing circuit performing a process on the voltage to generate a peak voltage and outputting the peak voltage to the protection circuit; and the protection circuit comparing the peak voltage to a reference voltage, if the peak voltage is greater than the reference voltage, the protection circuit controlling the power conversion circuit to stop power conversion functions, and if the peak voltage is smaller than the reference voltage, the protection circuit controlling the power conversion circuit to start power conversion functions.

16. The method according to claim 15, the current-voltage conversion circuit including a first resistor and a temperature-sampling module, wherein the method includes:

when the SCR device is connected to the SCR current-protection circuit, the temperature sampling circuit sampling a temperature of the first resistor, calculating a voltage applied on the first resistor based on the temperature of the first resistor, and outputting the voltage to the voltage-peak processing circuit.

17. The method according to claim 15, the protection circuit including a voltage-sampling circuit and a hysteresis comparator, wherein the method includes:

the voltage-sampling circuit sampling and calculating the peak voltage outputted by the voltage-peak processing circuit to obtain an output voltage; and the hysteresis comparator comparing the output voltage to the reference voltage, wherein:

if the output voltage is greater than the reference voltage, the hysteresis comparator outputs a logic low level to turn off the power conversion circuit; and if the output voltage is smaller than the reference voltage, the hysteresis comparator outputs a logic high level to turn on the power conversion circuit.

18. The method according to claim 15, the SCR detection circuit including a current sensor and a detection circuit, the method includes:

when the SCR device is connected to the SCR current-protection circuit, the current sensor sampling a current flowing through the current sampling point, outputting a new current, and the detection circuit converting the new current to a voltage, and outputting the voltage to the protection circuit.

19. The method according to claim 18, the protection circuit including a voltage-sampling circuit and a hysteresis comparator, wherein the method includes:

the voltage-sampling circuit sampling and calculating the voltage outputted by the detection circuit to obtain an output voltage; and the hysteresis comparator comparing the output voltage to the reference voltage, wherein if the output voltage is greater than the reference voltage, the hysteresis comparator outputs a logic low level to turn off the power conversion circuit; and if the output voltage is smaller than the reference voltage, the hysteresis comparator outputs a logic high level to turn on the power conversion circuit.

\* \* \* \* \*